(12) United States Patent
Kurata

(10) Patent No.: US 9,557,455 B2
(45) Date of Patent: Jan. 31, 2017

(54) OPTICAL ELEMENT

(75) Inventor: Toshihiko Kurata, Yamato (JP)

(73) Assignee: Nikon Corporation, Tokyo (JP)

( * ) Notice: Subject to any disclaimer, the term of this patent is extended or adjusted under 35 U.S.C. 154(b) by 203 days.

(21) Appl. No.: 14/111,551

(22) PCT Filed: Apr. 4, 2012

(86) PCT No.: PCT/JP2012/002358
§ 371 (c)(1),
(2), (4) Date: Oct. 12, 2013

(87) PCT Pub. No.: WO2012/140851
PCT Pub. Date: Oct. 18, 2012

(65) Prior Publication Data
US 2014/0036368 A1 Feb. 6, 2014

(30) Foreign Application Priority Data

Apr. 13, 2011 (JP) .................. 2011-089203

(51) Int. Cl.
*G02B 5/18* (2006.01)
*B29D 11/00* (2006.01)
(Continued)

(52) U.S. Cl.
CPC .............. *G02B 5/18* (2013.01); *B29C 43/021* (2013.01); *B29D 11/0073* (2013.01);
(Continued)

(58) Field of Classification Search
CPC ..... G02B 5/1814; G02B 27/4211; G02B 5/18; G02B 3/08; G02B 5/1866; G02B 5/18657; G02B 5/1857; B29C 43/021; B29D 11/00269; B29D 11/00769; B29L 2011/0016
(Continued)

(56) References Cited

U.S. PATENT DOCUMENTS 7,821,715 B2 * 10/2010 Suzuki ................. G02B 5/1842
359/576
2001/0026399 A1 * 10/2001 Nakabayashi ....... G02B 5/1857
359/576
(Continued)

FOREIGN PATENT DOCUMENTS

JP 05-100106 A 4/1993
JP 2001-141918 A 5/2001
(Continued)

OTHER PUBLICATIONS

Dow Chemical Product Stewardship Manual, p. 6, May 2007, http://msdssearch.dow.com/PublishedLiteratureDOWCOM/dh_091d/0901b8038091ddc0.pdf?filepath=/296-00312.pdf&fromPage=GetDoc, last viewed on Jul. 10, 2015.*

(Continued)

*Primary Examiner* — Scott J Sugarman
*Assistant Examiner* — Kristina Deherrera
(74) *Attorney, Agent, or Firm* — Shapiro, Gabor and Rosenberger, PLLC

(57) ABSTRACT

An optical element formed by stacking each of two resin layers on a glass substrate, wherein when the second resin layer of the two resin layers counting from the glass substrate is formed, an external circumferential part of the second resin layer is formed so as to be located inward of the outer circumferential part of the first resin layer, which is located closer to the glass substrate than the second resin layer.

7 Claims, 5 Drawing Sheets

(51) Int. Cl.
- *G02B 3/08* (2006.01)
- *B29C 43/02* (2006.01)
- *B29L 11/00* (2006.01)

(52) U.S. Cl.
 CPC .. *B29D 11/00269* (2013.01); *B29D 11/00769* (2013.01); *G02B 3/08* (2013.01); *G02B 5/1814* (2013.01); *B29L 2011/0016* (2013.01)

(58) Field of Classification Search
 USPC ... 359/558–576; 345/87, 7–9; 264/1.1, 1.36, 264/1.7, 1.8, 2.5, 2.7; 428/172–173
 See application file for complete search history.

(56) References Cited

U.S. PATENT DOCUMENTS

| | | | |
|---|---|---|---|
| 2004/0059013 A1* | 3/2004 | Tanabe | C08F 283/006 522/90 |
| 2005/0237614 A1 | 10/2005 | Nakabayashi et al. | |
| 2006/0029889 A1* | 2/2006 | Wang | G02B 5/1857 430/321 |
| 2006/0093793 A1 | 5/2006 | Miyakawa et al. | |
| 2008/0136757 A1* | 6/2008 | Iwata et al. | 345/87 |
| 2010/0110548 A1 | 5/2010 | Korenaga et al. | |
| 2010/0246008 A1 | 9/2010 | Murata et al. | |

FOREIGN PATENT DOCUMENTS

| | | |
|---|---|---|
| JP | 4029208 B2 | 1/2008 |
| JP | 2009-066827 A | 4/2009 |
| JP | 2010-102353 A | 5/2010 |
| WO | WO 2009/098846 A1 | 8/2009 |
| WO | WO 2010/032347 A1 | 3/2010 |

OTHER PUBLICATIONS

Office Action issued Mar. 4, 2015, in Chinese Patent Application No. 201280018460.6.

International Search Report from International Patent Application No. PCT/JP2012/002358, Jul. 3, 2012.

* cited by examiner

OPTICAL ELEMENT

TECHNICAL FIELD

The present invention relates to an optical element, and to a method for manufacturing the same.

TECHNICAL BACKGROUND

Molding processes are frequently employed in the manufacture of optical elements (for example, see Patent Document 1). For example, in the case of a molding process for a phase Fresnel lens, which is a bonded-multilayer diffractive optical element, a first resin material is packed into a gap between a disk-shaped glass substrate and a molding die positioned in proximity to the glass substrate, and a first resin layer having a diffraction grating is molded. Then, a molding die is pressed against a second resin material having a different refractive index than the first resin material, which has been dripped onto the first resin layer, and a second resin layer is molded. Consequently, a bonded-multilayer diffractive optical element be molded.

PRIOR ARTS LIST

Patent Document

Japanese Patent Publication No. 4029208 (B2)

SUMMARY OF THE INVENTION

Problems to be Solved by the Invention

However, during formation of multiple layers by the method mentioned above, when the outside diameter of the second layer is greater than the outside diameter of the first layer, there is a tendency for gases to get trapped inside the external circumferential part of the second layer which protrudes out from, the first layer, creating a risk of air bubbles becoming incorporated into the optical element, and of degraded appearance.

With the foregoing in view, it is an object of the present invention to provide a method for manufacturing an optical element that prevents incorporation of air bubbles, and an optical element manufactured thereby.

Means to Solve the Problems

To achieve this object, the method for manufacturing an optical element provides a method for manufacturing an optical element by stacking and molding individual layers of a plurality of layers on a base material, wherein when those among the plurality of layers constituting the second and subsequent layers as counted from the base material are to be molded, the molding is conducted in such a way that the external circumferential part of the layer to be molded is located inward from the external circumferential part of the layer located closer towards the base material than the layer.

In the above method, in preferred practice, the plurality of layers constitutes two layers, and during molding of the layer constituting the second of the two layers as counted, from the base material, the molding is conducted in such a way that the external circumferential part, of the second layer is located inward from the external circumferential part of the first layer, which is located closer towards the base material than the second layer.

In the above manufacturing method, the first layer and the second layer are respectively molded from a resin material, and the viscosity of the resin material employed during molding of the second layer can be 3000 to 7000 mPa·s.

Additionally, in the above manufacturing method, in preferred practice, the first layer, which has a diffraction grating, is molded onto the base material, the second layer is stacked and molded onto the first layer so as to become bonded to the diffraction grating, and the resin material employed during molding of the first layer having a viscosity of 200 to 800 mPa·s.

Additionally, in the above manufacturing method, each of the layers is respectively molded from a resin material, and the viscosity of the resin material employed during molding of at least any one of the plurality of layers can be 3000 to 7000 mPa·s.

Additionally, in the above manufacturing method, each of the layers preferably has a thickness of 50 to 400 µm.

The optical element according to a first invention is manufactured by the aforementioned method for manufacturing an optical element.

The optical element according to a second invention is provided with a base material, and with a plurality of layers stacked and molded onto the base material, the external circumferential part of those among the plurality of layers constituting the second and subsequent layers as counted from the base material, being located inward from the external circumferential part of the layer located closer towards the base material than the layer.

In the second optical element, in preferred practice, the plurality of layers constitutes two layers, the external circumferential part of the layer constituting the second of the two layers, as counted from the base material, being located inward from the external circumferential part of the first layer, which is located closer towards the base material than the second layer.

Additionally, in the second optical element, the first layer and the second layer are respectively molded from a resin material, and the viscosity of the resin material employed during molding of the second layer can be 3000 to 7000 mPa·s.

Additionally, in the second optical element, in preferred practice, the first layer, which has a diffraction grating, is molded onto the base material, the second layer is stacked and molded onto the first layer so as to become bonded, to the diffraction grating, and the resin material employed during molding of the first layer having a viscosity of 200 to 800 mPa·s.

Additionally, in the second optical element, each of the plurality of layers is respectively molded from a resin material, and the viscosity of the resin material employed during molding of at least any one of the plurality of layers can be 3000 to 7000 mPa·s.

Additionally, in the second optical element, each of the plurality of layers preferably has a thickness of 50 to 400 µm, respectively.

Advantageous Effects of the Invention

According to the present invention, incorporation of air bubbles info an optical element can be prevented.

DESCRIPTION OF THE EMBODIMENTS

Figure 2:
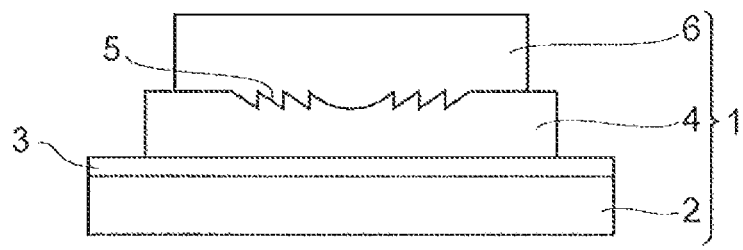
FIG. 2 is a side sectional view of the phase Fresnel lens according to the first embodiment.

The preferred embodiments of the present invention are described below, making reference to the accompanying drawings. As an example of the optical element in a first embodiment, a phase Fresnel lens (hereinbelow designated as "PF lens 1"), which is a bonded-multilayer diffractive optical element, is shown in FIG. 2. The PF lens 1 of the first embodiment is constituted by a glass substrate 2, a first resin layer 4 molded onto the glass substrate 2, and a second resin layer 6 stacked and molded onto the first resin layer 4. The glass substrate 2 is molded into a disk shape from a transparent glass material, and a primer layer 3 of a silane coupling agent is formed on a one face of the glass substrate 2 (the face to be joined to the first resin layer 4).

The resin layer 4, which is the first layer counting from the glass substrate 2, is formed to disk shape front a transparent resin material, and a diffraction grating 5 in which a plurality of ring zones are arrayed in concentric circles is formed on a one face of the first resin layer 4 (the face to be joined to the second resin layer 6). The diameter of the first resin layer 4 is slightly smaller than the diameter of the glass substrate 2 (and is larger than the effective diameter of the PF lens 1), with the external circumferential part of the first resin layer 4 being located inward of the external circumferential part of the glass substrate 2. Also, the thickness of the first resin layer 4 is 50 µm to 400 µm, for example. For simplicity in description in the drawings, the diffraction grating 5 is depicted as having a reduced number of ring zones; however, the actual number of ring zones would be sufficiently great as to be serviceable. Also, in the drawings, hatching is omitted in cross sectional views, for simplicity in description.

The resin layer 6, which is the second layer counting from the glass substrate 2, is molded to disk shape from a transparent resin material having a different refractive index than the first resin layer 4. The diameter of the second resin layer 6 is slightly smaller than the diameter of the first resin layer 4 (and is larger than the effective diameter of the PF lens 1), with the external circumferential part of the second resin layer 6 being located inward of the external circumferential part of the first, resin layer 4. Also, the thickness of the second resin layer 6 is 50 µm to 400 µm, for example.

Figure 1A:
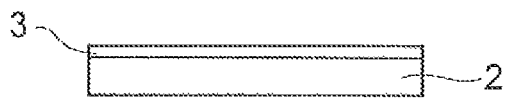
FIGS. 1A to 1E are schematic diagrams sequentially showing the steps for molding a phase Fresnel lens according to a first embodiment and 1F is a schematic diagram showing a modification of a phase Fresnel lens.
Figure 1B:
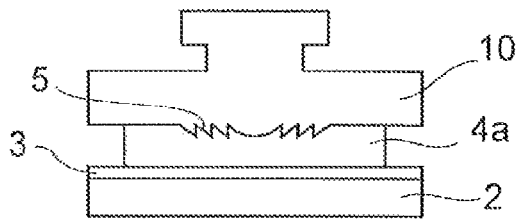
Figure 3:
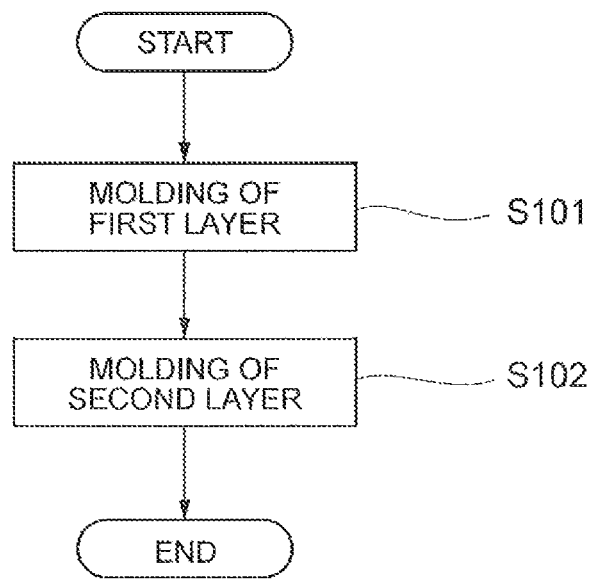
FIG. 3 is a flowchart showing a manufacturing method for a phase Fresnel lens.

The method for manufacturing the PF lens 1 constituted in the above manner is described with reference to the flowchart shown in FIG. 3. Firstly, the first resin layer 4 is molded and joined onto the glass substrate 2 (Step S101). During molding of the first resin layer 4, as shown in FIG. 1A, a liquid mixture of a silane coupling agent/ethyl alcohol/water (the water being made moderately acidic with acetic acid or the like) is applied by spin coating over the entire surface of a one face of the glass substrate 2, and baked to form a primer layer 3. A first molding die (mold) 10 having a predetermined diffraction grating is positioned adjacently to the one face of the glass substrate 2 on which the primer layer 3 has been formed, and as shown in FIG. 1B, an uncured resin 4a for molding the first resin layer 4 is packed into the gap between them. In this state, the resin 4a is irradiated with ultraviolet light at a predetermined exposure (for example, 2000-4000 mJ/cm$^2$) from the other face of the glass substrate 2, curing the uncured resin 4a, which is then released from the mold.

Consequently, the first resin layer 4 having the diffraction grating 5 is molded through transfer of the grating shape of the first molding die 10 to the resin 4a, and the first resin layer 4 is joined to the one face of the glass substrate 2 via the primer layer 3. The resin material (resin 4a) employed for the first resin layer 4 is an ultraviolet-curing resin having a viscosity of 200 mPa·s to 800 mPa·s in the uncured state. During molding, the resin 4a is packed in such a way that the external circumferential part of the first resin layer 4 is located inward of the external circumferential part of the glass substrate 2.

Figure 1C:
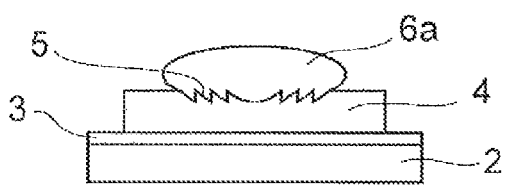
Figure 1D:
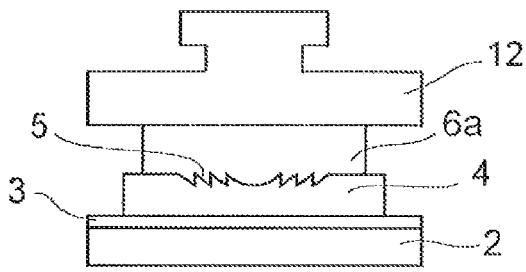

Next, the second resin layer 6 is stacked and molded onto the first resin layer 4, becoming joined thereto (Step S102). During molding of the second resin layer 6, as shown in FIG. 1C, an uncured resin 6a for molding the second resin layer 6 is dripped onto the first resin layer 4; and as shown in FIG. 1D, a molding die (mold) 12 is placed against the dripped resin 6a, then cured with ultraviolet in the same manner as the first layer, and released from the mold. The surface (transfer surface) of the second molding die 12 is formed to a flat surface. The surface (transfer surface) of the second molding die 12 is determined according to the shape of the second resin layer 6, and may be a spherical face or aspherical face.

Figure 1E:
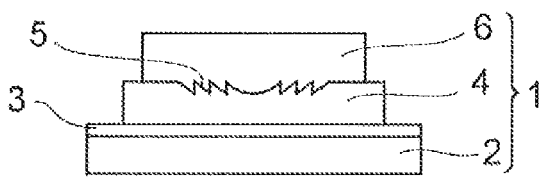

As shown in FIG. 1E, the second resin layer 6 is molded in such a way as to bond to the diffraction grating 5 at the other face, and the second resin layer 6 is joined to the one face of the first resin layer 4. The resin material (resin 6a) employed for the second resin layer 6 is an ultraviolet-curing resin having a viscosity, in the uncured state, of 3000 mPa·s to 7000 mPa·s. During molding, the second molding die 12 is brought into contact against the resin 6a in such a way that the external circumferential part of the second resin layer 6 is located inward of the external circumferential part of the first resin layer 4. In this way, the PF lens 1 in which the two resin layers 4, 6 are molded onto the glass substrate 2 is manufactured.

As a result, according to the first embodiment, because the external circumferential part, of the second resin layer 8 is located inward of the external circumferential part, of the first resin layer 4 which is located closer to the glass substrate 2 than the second resin layer 6, during molding, the external circumferential part of the resin 6a of the second layer does not protrude out from the first resin layer 4 so that gases become entrained inside, and air bubbles can be prevented from being incorporated into the PF lens 1.

The viscosity of the resin material (resin 6a) employed during molding of the second resin layer 6 is 3000 mPa·s to 7000 mPa·s, and in cases in which a resin material of such relatively high viscosity is employed for the second resin layer 6, when the external circumferential part of the resin material 6a of the second layer protrudes out from the first resin layer 4 during molding, gases would tend to became entrained therein. Therefore, incorporation of air bubbles into the PF lens 1 can be effectively prevented. The range of viscosity of the resin material (resin 6a) employed during molding of the second resin layer 6 can be from 4600 mPa·s to 5400 mPa·s.

The viscosity of the resin material, (resin 4a) employed during molding of the first resin layer 4 is 200 mPa·s to 800 mPa·s, and by employing a resin material of lower viscosity than the second resin layer 6 for the first resin layer 4, incorporation of air bubbles into the first resin layer 4 can be prevented. The range of viscosity of the resin material (resin 4a) employed during molding of the first resin layer 4 can be from 400 mPa·s to 600 mPa·s.

The thicknesses of the first resin layer 4 and the second resin layer 6 are respectively from 50 μm to 400 μm, and the two resin layers can be molded, as appropriate, within this range of thickness for each layer.

Figure 4:
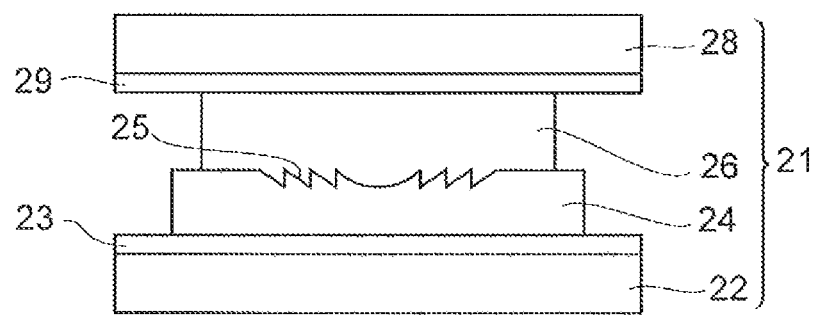
FIG. 4 is a side sectional view of a phase Fresnel lens according to a second embodiment.

Next, a second embodiment of a PF lens is described while referring to FIG. 4. The PF lens 21 of the second embodiment is constituted by a first glass substrate 22, a first resin layer 24 molded onto the first glass substrate 22, a second resin layer 26 stacked and molded onto the first resin layer 24, and a second glass substrate 28 stacked onto and joined to the second resin layer 26. The first glass substrate 22 is molded to disk shape from a transparent glass material, and a primer layer 23 of a silane coupling agent is formed on a one face of the first glass substrate 22 (the face to be joined to the first resin layer 24).

The resin layer 24, which is the first layer counting from the first glass substrate 22, is formed into disk shape from a transparent resin material, and a diffraction grating 25 in which a plurality of ring zones are arrayed in concentric circles is formed on a one face of the first resin layer 24 (the face to be joined to the second resin layer 26). The diameter of the first resin layer 24 is slightly smaller than the diameter of the first glass substrate 22 (and is larger than the effective diameter of the PF lens 21), with the external circumferential part of the first resin layer 24 being located inward of the external circumferential part of the first glass substrate 22. Also, the thickness of the first resin layer 24 is 50 μm to 400 μm, for example.

The resin layer 26, which is the second layer counting from the first glass substrate 22, is molded to disk shape from a transparent resin material having a different refractive index than the first resin layer 24. The diameter of the second resin layer 26 is slightly smaller than the diameter of the first resin layer 24 (and is larger than the effective diameter of the PF lens 21), with the external circumferential part of the second resin layer 26 being located inward of the external circumferential part of the first resin layer 24. Also, the thickness of the second resin layer 26 is 50 μm to 400 μm, for example.

The second glass substrate 28 is molded to disk shape from a transparent glass material, and a primer layer 29 of a silane coupling agent is formed on the other face of the second glass substrate 28 (the face to be joined to the second resin layer 26).

Figure 5A:
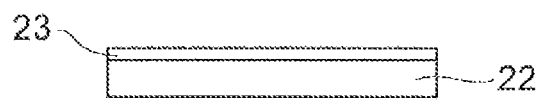
FIGS. 5A to 5D are schematic diagrams sequentially showing the steps for molding the phase Fresnel lens according to the second embodiment.
Figure 5B:
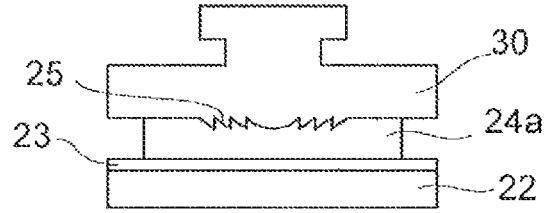

The method for manufacturing the PF lens 21 constituted in the above manner is now described. The flow of the manufacturing method of the PF lens 21 according to the second embodiment is similar to that in the case of the first embodiment, and the description will employ the flowchart shown in FIG. 3. Firstly, the first resin layer 24 is molded and joined onto the first glass substrate 22 (Step S101). During molding of the first resin layer 24 onto the first glass substrate 22, as shown in FIG. 5A, a liquid mixture of a silane coupling agent/ethyl alcohol/water (the water being made moderately acidic with acetic acid or the like) is applied by spin coating over the entire surface of a one face of the first glass substrate 22, and baked to form a primer layer 23. A molding die (mold) 30 having a predetermined diffraction grating is positioned adjacently to the one face of the first glass substrate 22 onto which the primer layer 23 has been formed, and as shown in FIG. 5B, an uncured resin 24a for molding the first resin layer 24 is packed into the gap between them. In this state, the resin 24a is irradiated with ultraviolet light for a predetermined duration (for example, two minutes) from the other face of the first glass substrate 22, curing the uncured resin 24a, which is then released from the mold.

Consequently, the first resin layer 24 having the diffraction grating 25 is molded through transfer of the grating shape of the molding die 30 to the resin 24a, and the first resin layer 24 is joined to the one face of the glass substrate 22 via the primer layer 23. The resin material (resin 24a) employed for the first resin layer 24 is an ultraviolet-curing resin having a viscosity of 200 mPa·s to 800 mPa·s in the uncured state. During molding, the resin 24a is packed in such a way that the external circumferential part of the first resin layer 24 is located inward of the external circumferential part of the first glass substrate 22.

Figure 5C:
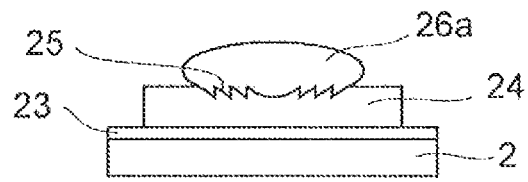
Figure 5D:
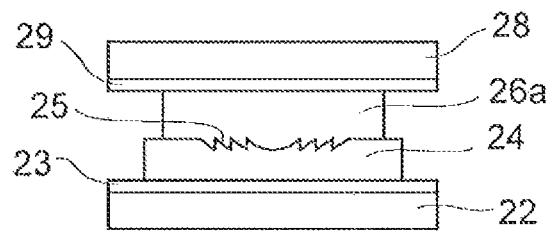

Next, the second resin layer 26 is stacked and molded onto the first resin layer 24, becoming joined thereto (Step S102). During molding of the second resin layer 26, as shown in FIG. 5C, an uncured resin 26a for molding the second resin layer 26 is dripped onto the first resin layer 24; and as shown in FIG. 5D, the second glass substrate 28 is placed against the dripped resin 26a, then cured with ultraviolet in the same manner as the first layer. At this time, the primer layer 29 has been formed on the other face of the second glass substrate 28 in the same manner as for the first glass substrate 22, and through contact of this primer layer 29 against the resin 26a, molding of the second resin layer 26 and joining of the second glass substrate 28 to the second resin layer 26 can be accomplished simultaneously.

Consequently, the second resin layer 26 is molded in such a way as to bond to the diffraction grating 25 at the other face, as well as joining the second resin layer 26 to the one face of the first resin layer 24, while simultaneously joining the second glass substrate 28 to the one face of the second resin layer 26 via the primer layer 29. The resin material (resin 26a) employed for the second resin layer 26 is an ultraviolet-curing resin having a viscosity, in the uncured state, of 3000 mPa·s to 7000 mPa·s. During molding, the second glass substrate 28 is brought into contact against the resin 26a in such a way that the external circumferential part of the second resin layer 26 is located inward of the external circumferential part of the first resin layer 24. In this way, the PF lens 21 of two molded resin layers 24, 26 between the two glass substrates 22, 28 is manufactured.

As a result, according to the second embodiment, advantageous effects comparable to those in the case of the first embodiment can be obtained. Moreover, according to the second embodiment, the second glass substrate 28, on which the primer layer 29 has been formed, is brought into contact against the resin 26a while molding the second resin layer 26, whereby molding of the second resin layer 26 and joining of the second glass substrate 28 to the second resin layer 26 can be accomplished simultaneously. Therefore, in the case of manufacture of the PF lens 21 by molding of the two resin layers 24, 26 between the two glass substrates 22, 28, the need to mold the second resin layer with a molding die is obviated, and the production process of the PF lens 21 can be simplified.

Figure 1F:
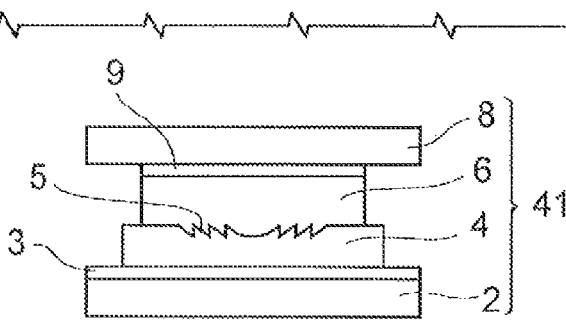

In the second embodiment mentioned above, the second resin layer 26 is molded while the second glass substrate 28 on which the primer layer 29 has been formed is brought into contact against the resin 26a; however, there is no limitation to this. For example, in the same manner as in the first embodiment as shown in FIGS. 1A to 1E, after molding the two resin layers 4, 6 over the (first) glass substrate 2, an adhesive 9 could be used to stack and adhere (join) the second glass substrate 8 onto the second resin layer 6 as shown in FIG. 1F. Consequently, because the second glass substrate 8 is adhered by the adhesive 9, in the case of manufacture to a PF lens 41 in which the two resin layers 4, 6 are molded between the two glass substrates 2, 8, the need to form a primer layer on the second glass substrate 8 is obviated, and the PF lens 41 manufacturing process can be simplified.

Additionally, whereas in the embodiments mentioned above, only two resin layers are molded over the (first) glass substrate, such an arrangement is not provided by way of limitation; it would be acceptable, for example, to mold three or more layers, applying the present invention during stacking and molding of each layer of the plurality of layers on the base material. In this case, the viscosity of the resin material employed during molding of at least any one of the plurality of layers can be one having a viscosity of 3000 mPa·s to 7000 mPa·s. The viscosity of the resin can be 4600 mPa·s to 5400 mPa·s.

In the embodiments mentioned above, a glass substrate is employed as the base material, but such an arrangement is not provided by way of limitation; a substrate of plastic or the like, for example, could also foe employed, as long as the material is transparent.

In the embodiments mentioned above, the glass substrate, the first resin layer, and the second layer are each molded to disk shape, but such an arrangement is not provided by way of limitation; at least any one face (the first or other face) of the glass substrate, the first resin layer, and the second resin layer may be a spherical face or an aspherical face. Additionally, after the first resin layer and the second resin layer have been formed on the glass substrate, the external circumferential parts may be cut to effect finishing the desired shape. In a case in which the second resin layer has an aspherical face, the thickness of the second resin layer can be from 50 μm to 1000 μm.

While the embodiments mentioned above describe the example of a PF lens, which is a type of diffractive optical element, such an arrangement is not provided by way of limitation; the invention is applicable sis well to ordinary Fresnel lenses, aspherical lenses, microlens arrays, and the like.

EXPLANATION OF NUMERALS AND CHARACTERS

1: PF lens (first embodiment)
2: glass substrate (base material)
4: first resin layer
5: diffraction grating
6: second resin layer
21: PF lens (second embodiment)
22: first glass substrate (base material)
24: first resin layer
25: diffraction grating
26: second resin layer
41: PF lens (modification)

The invention claimed is:

1. An optical element comprising:
a base material; and
a plurality of resin layers stacked and molded onto the base material,
wherein external circumferential parts of those among the plurality of layers constituting the second and subsequent layers, as counted from the base material, being located inward from an external circumferential part of a first layer of the plurality of layers, which is located closer to the base material than the second layer, and
wherein at least one of the second and subsequent resin layers is molded from a resin material having a viscosity of 3000 to 7000 mPa·s.

2. The optical element according to claim 1, wherein
the plurality of layers constitutes two layers, and
the external circumferential part of the layer constituting the second layer, as counted from the base material, is located inward from the external circumferential part of the first layer, which is located closer to the base material than the second layer.

3. The optical element according to claim 2, wherein:
the first layer, which has a diffraction grating, is molded onto the base material;
the second layer is stacked and molded onto the first layer so as to become bonded to the diffraction grating;
the resin material used in molding of the first layer has a viscosity of 200 to 800 mPa·s; and
the resin material used in molding of the second layer has a viscosity of 3000 to 7000 mPa·s.

4. An optical element comprising:
a base material; and
a plurality of layers stacked and molded onto the base material,
wherein external circumferential parts of those among the plurality of layers constituting second and subsequent layers, as counted from the base material, being located inward from an external circumferential part of a first layer of the plurality of layers, which is located closer to the base material than the second layer, and
wherein thicknesses of the plurality of layers are respectively 50 μm to 400 μm.

5. The optical element according to claim 4, wherein
the plurality of layers constitutes two layers,
the external circumferential part of the layer constituting the second layer, as counted from the base material, is located inward from the external circumferential part of the first layer, which is located closer to the base material than the second layer, and
no diffraction grating is formed on the surface of the second layer, which faces opposite the first layer.

6. The optical element according to claim 5, further comprising a second base material mounted on the second layer,
wherein the second base material is used to mold a surface of the second layer.

7. The optical element according to claim 6, wherein
no diffraction grating is formed on the surface of the second layer, which is formed by the second base material.

* * * * *